United States Patent [19] [11] Patent Number: 4,831,462
Abuyama et al. [45] Date of Patent: May 16, 1989

[54] IMAGE FORMING APPARATUS WITH HALFTONE CONTROL FUNCTION

[75] Inventors: Yasuo Abuyama, Ebina; Akihiko Someya, Yokohama, both of Japan

[73] Assignee: Kabushiki Kaisha Toshiba, Kawasaki, Japan

[21] Appl. No.: 100,764

[22] Filed: Sep. 24, 1987

[30] Foreign Application Priority Data

Sep. 29, 1986 [JP] Japan ................................ 61-230611
Sep. 29, 1986 [JP] Japan ................................ 61-230713

[51] Int. Cl.⁴ .............................................. H04N 1/21
[52] U.S. Cl. ..................................... 358/298; 358/75; 346/76 PH
[58] Field of Search ..................... 346/76 PH; 358/75; 1/298

[56] References Cited

U.S. PATENT DOCUMENTS 4,593,297 6/1986 Suzuki ................................ 358/298
4,639,742 1/1987 Takahashi ....................... 346/76 PH Primary Examiner—E. A. Goldberg
Assistant Examiner—Melissa C. Chiu
Attorney, Agent, or Firm—Cushman, Darby & Cushman

[57] ABSTRACT

In one aspect of the present invention, an image forming section forms an image corresponding to the image data on an image receiving medium by selectively using at least first and second image forming media different from each other. A gradation determinator determines first and second gradation methods corresponding to the first and second image forming media which are selectively used. A first gradation section performs gradation conversion corresponding to the first gradation method. A second gradation section performs gradation conversion corresponding to the second gradation method. A controller supplies the image data to the image forming section through the first or second gradation section in response to a determination result from the gradation determinator so that the image forming section forms a halftone-controlled image. In another aspect of the present invention, a color image data output section outputs color image data to be formed on an image receiving medium as a main image. A positioning-mark data output section outputs positioning-mark data to be formed on a predetermined position of the image receiving medium as a positioning-mark to be used after image formation. A gradation section performs predetermined gradation conversion of the color image data. An image forming section forms the main image with halftone control on the image receiving medium using a single- or multicolor image forming medium in accordance with the color image data subjected to gradation conversion and the positioning-mark data, and forms the positioning-mark without halftone control on the predetermined position of the image receiving medium.

16 Claims, 14 Drawing Sheets

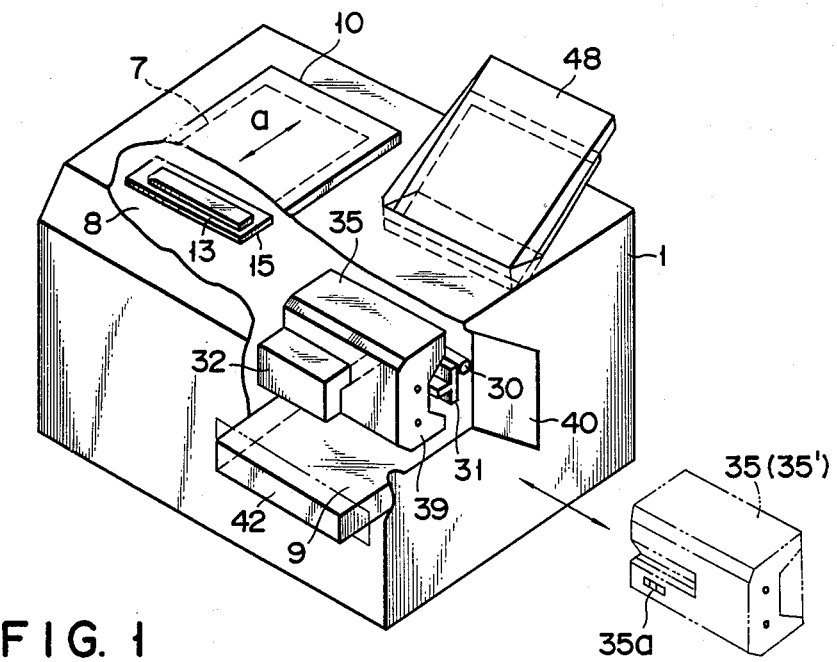
F I G. 1
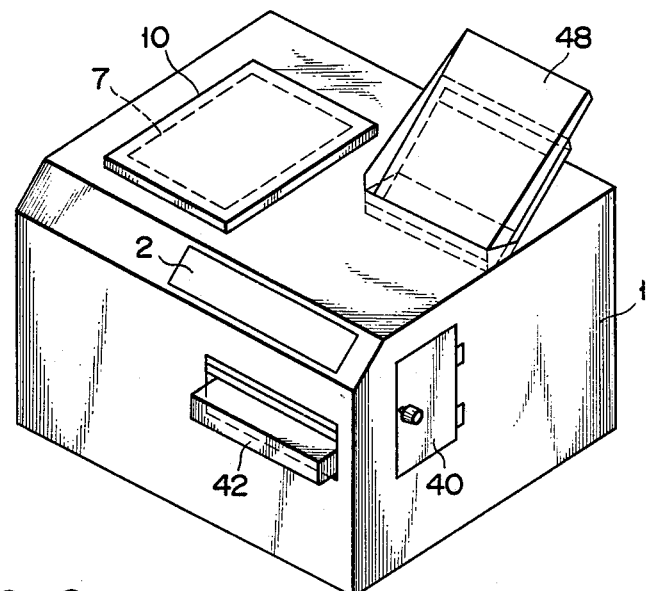
F I G. 2

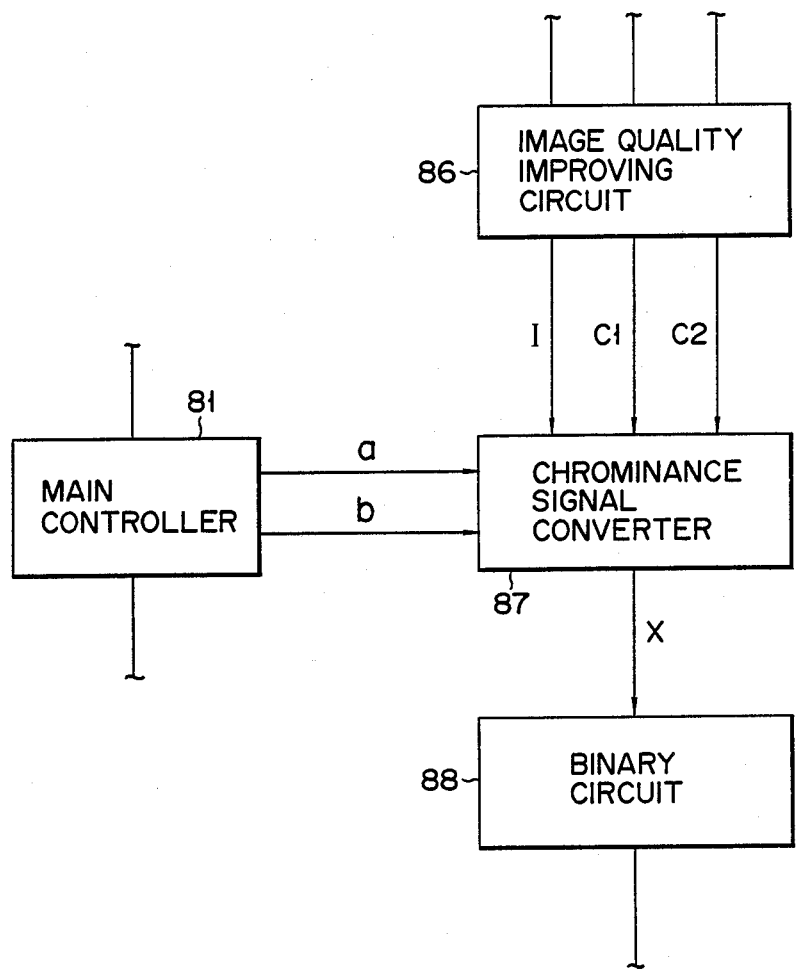
F I G. 10

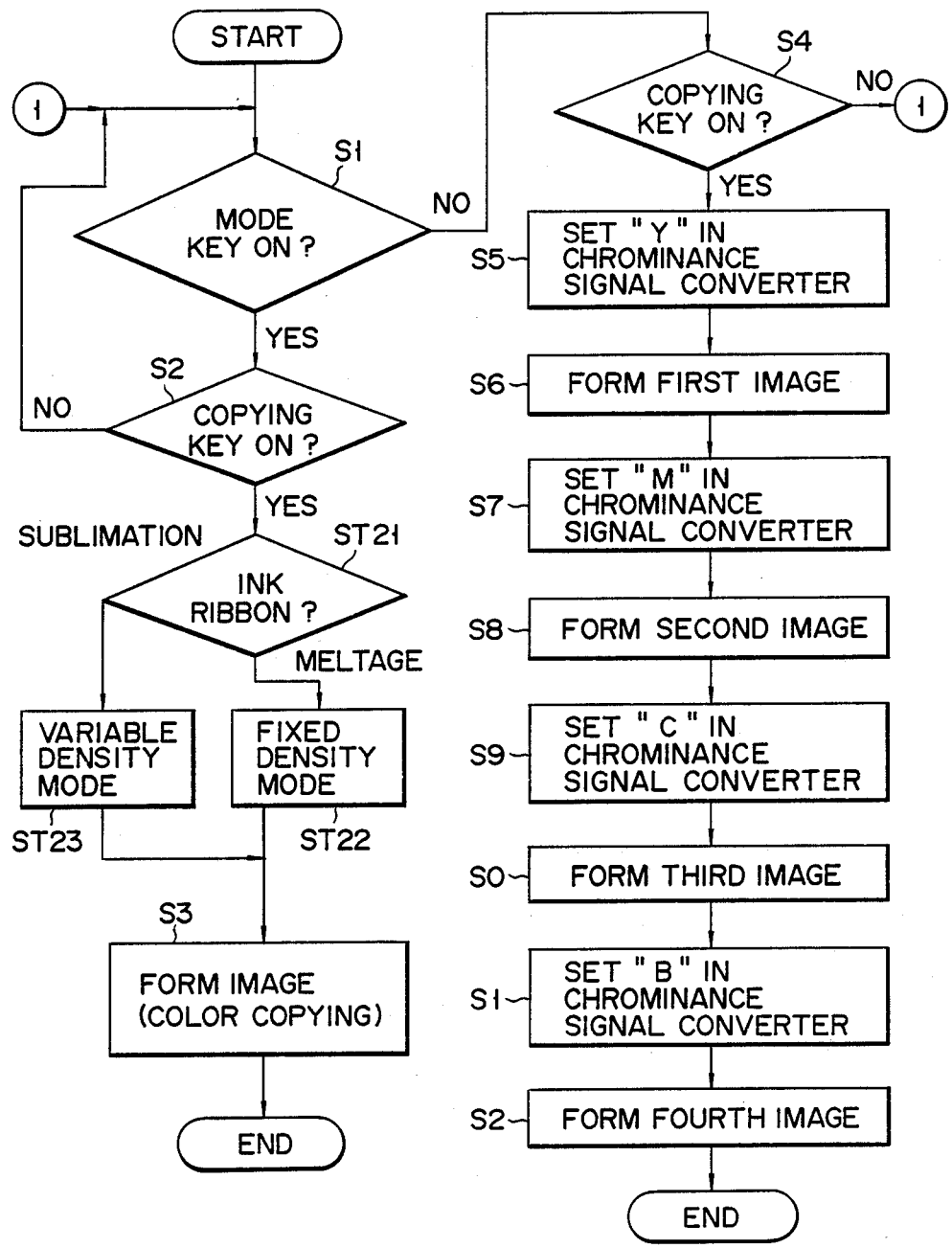
F I G. 11

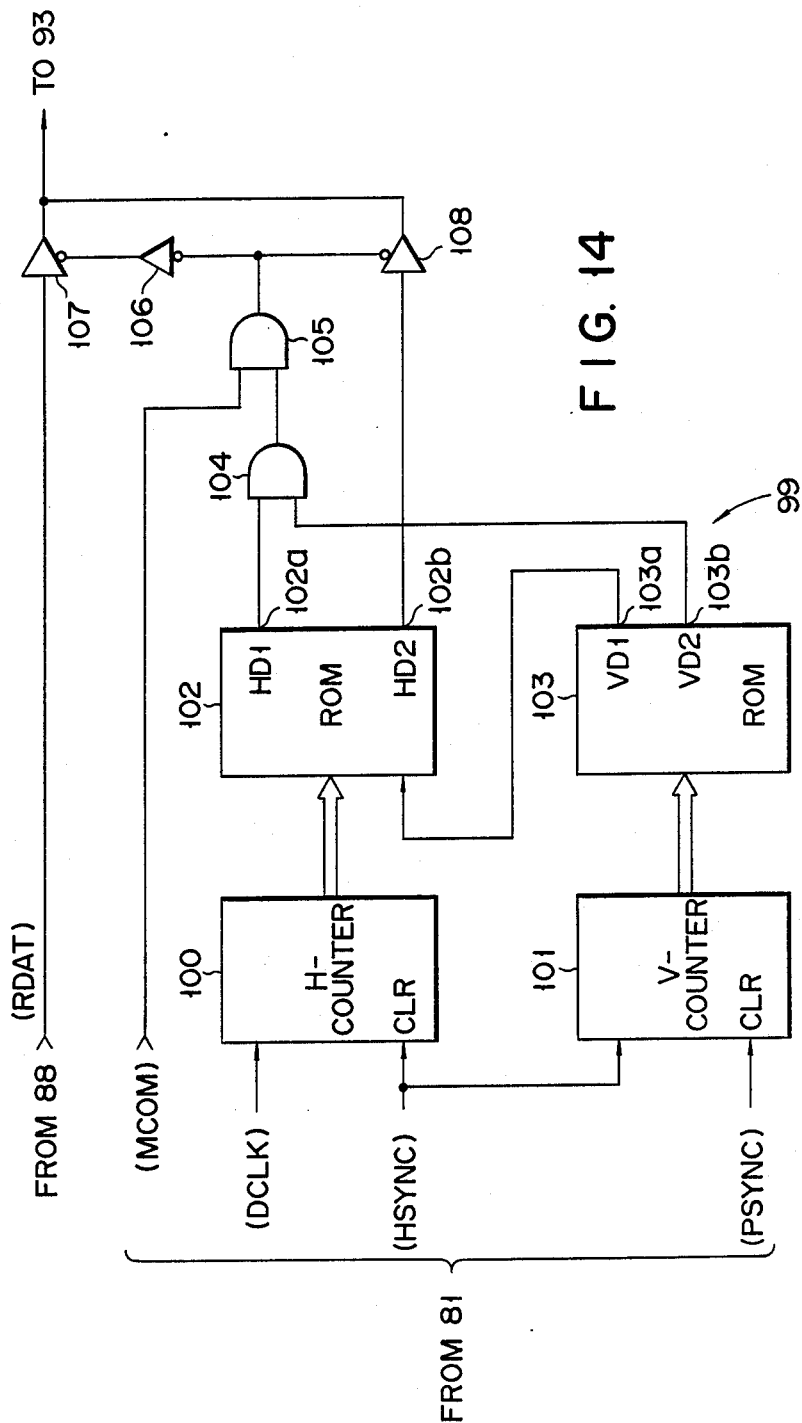
F I G. 14

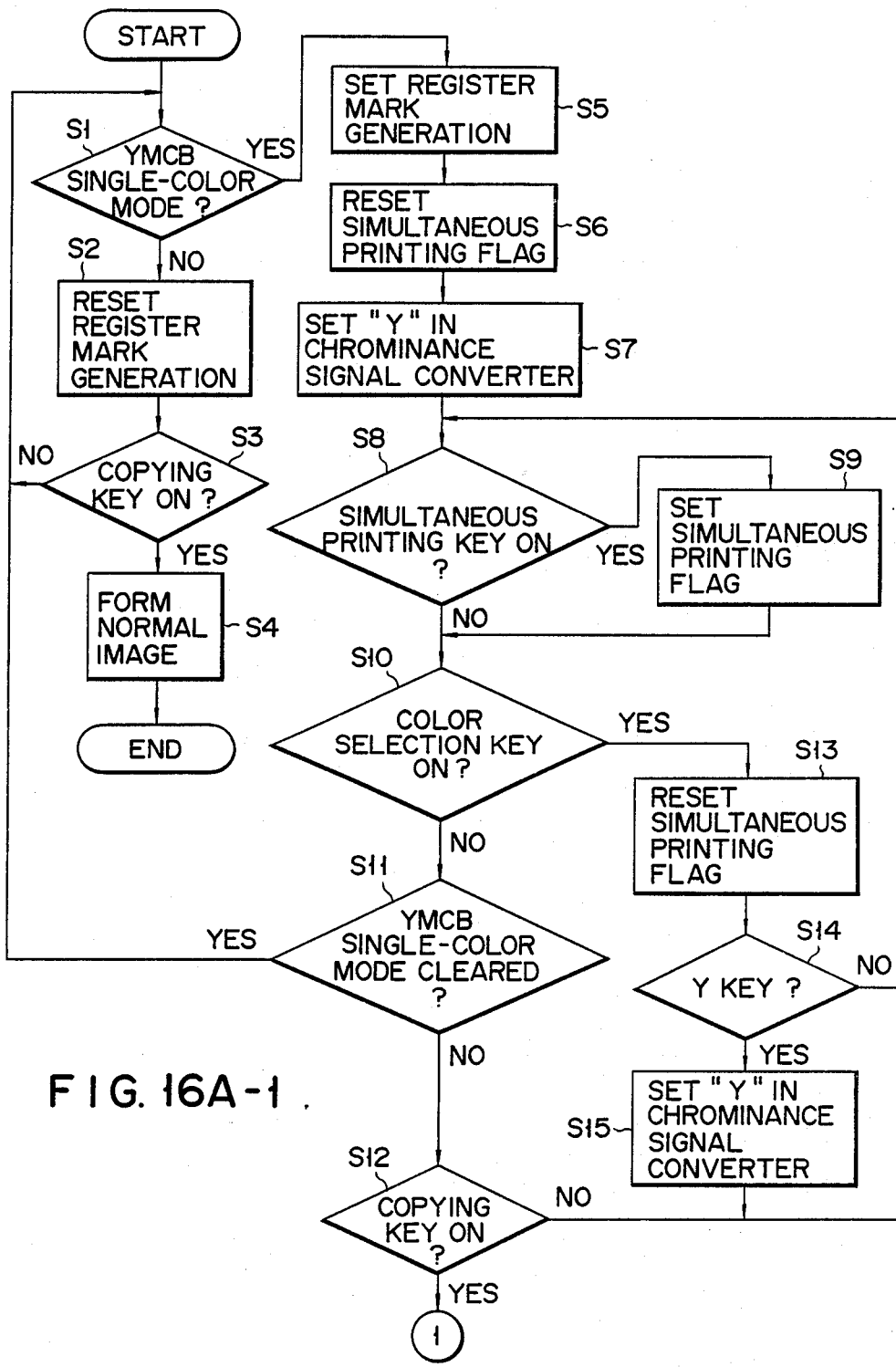
F I G. 16A-1.

IMAGE FORMING APPARATUS WITH HALFTONE CONTROL FUNCTION

BACKGROUND OF THE INVENTION

This invention generally relates to an image forming apparatus and, more particularly, to an image forming apparatus capable of selective halftone control using a thermal transfer image forming medium such as an ink ribbon.

In recent years, as a method of obtaining a halftone image, an areal gradation method using a meltage thermal transfer ink ribbon and a density gradation method using a sublimation thermal transfer ink ribbon have developed. However, the density of each dot is not changed in the areal gradation method. In the density gradation method, the density is changed for each dot, so that halftone control can be achieved in units of dots. For this reason, a copying machine using the density gradation method has good resolution and can print an image clearer than that obtained by a copying machine using the areal gradation method. However, according to the density gradation method, printing time is undesirably prolonged. Therefore, a copying machine using the density gradation method is effective in a case wherein clear copies are desired even if a printing speed is low, but such a copying machine is not practical.

Accordingly, a demand has arisen for a system which can use the areal gradation method when a printing speed is more important than image quality as halftone control performance, and can use the density gradation method when the image quality is more important than the printing speed.

In recent years, graphic arts printing has developed markedly along with an advance in electronics, and electronic graphic arts printing has become very popular. In electronic graphic arts printing, the density of an image of an original is photoelectrically converted into an electrical signal and the electrical signal is subjected to predetermined processing to obtain a light intensity signal. The intensity signal is used to expose a film (photosensitive medium) with light. The exposed film is developed to prepare a negative or positive film for an original plate.

According to the above technique, however, the printing process is complicated and printing equipment is bulky, thus resulting in high costs. A conventional system is designed to produce only graphic arts films and cannot be used for other applications.

In order to align graphic arts films (block copies) of the respective colors, positioning marks (so-called register marks) are manually adhered to graphic arts films, thus degrading operability and causing potential positional shifts.

Accordingly, a demand has arisen for a system which can be used not only to form graphic arts films but also as, e.g., a color copying machine.

In this case, selective halftone control as described above is desired again. However, positioning marks must be easily and reliably adhered to the graphic arts films as described above. Therefore, it is necessary to reconsider halftone control for the positioning marks.

SUMMARY OF THE INVENTION

It is, therefore, an object of the present invention to provide a new and improved image forming apparatus with a halftone control function which can selectively realize halftone control by a first or second gradation method.

It is another object of the present invention to provide an image forming apparatus with a halftone control function and a positioning mark formation function which can easily form graphic arts films with halftone control, which is compact and inexpensive, which can be used also as a copying machine, and which can easily, reliably, and accurately adhere positioning marks without halftone control.

According to one aspect of the present invention, there is provided an image forming apparatus with a halftone control function, the apparatus comprising:

means for outputting image data;

image forming means for forming an image corresponding to the image data on an image receiving medium by selectively using at least first and second image forming media different from each other;

gradation determining means for determining first and second gradation methods corresponding to the first and second image forming media which are selectively used;

first gradation means for performing gradation conversion corresponding to the first gradation method;

second gradation means for performing gradation conversion corresponding to the second gradation method; and control means for supplying the image data to the image forming means through the first or second gradation means in response to a determination result from the gradation determining means so that the image forming means forms a halftone image.

According to another aspect of the present invention, there is provided an image forming apparatus with a halftone control function and a positioning-mark formation function, the apparatus comprising:

color image data output means for outputting color image data to be formed on an image receiving medium as a main image;

positioning-mark data output means for outputting positioning-mark data to be formed on a predetermined position of the image receiving medium as a positioning-mark to be used after image formation;

gradation means for performing predetermined gradation conversion of the color image data; and image forming means for forming the main image with halftone control on the image receiving medium using a single- or multi-color image forming medium in accordance with the color image data subjected to gradation conversion and the positioning-mark data, and for forming the positioning-mark without a halftone control on the predetermined position of the image receiving medium.

BRIEF DESCRIPTION OF THE DRAWINGS

These and other objects and features of the present invention can be understood through the following embodiments by reference to the accompanying drawings, in which:

FIGS. 1 to 11 are views for explaining an image forming apparatus according to a first embodiment of the present invention, in which FIG. 1 is a partially cutaway perspective view schematically showing the overall arrangement of the image forming apparatus;

FIG. 2 is a perspective view showing the outer appearance of the image forming apparatus, FIG. 3 is a schematic side view showing an arrangement of an original scanning unit in the apparatus, FIG. 4 is a perspective view showing a scanner moving mechanism of the original scanning unit shown in FIG. 3, FIG. 5 is a longitudinal sectional view schematically showing the arrangement of an image forming unit in the apparatus, FIG. 6 is a perspective view for explaining a transfer operation state, FIG. 7 is a plan view showing an arrangement of a thermal transfer ink ribbon, FIG. 8 is a plan view of an operation panel in the apparatus, FIG. 9. is a schematic block diagram of a control system in the apparatus, FIG. 10 is a detailed block diagram for explaining a chrominance signal converter in the control system, FIG. 11 is a flow chart for explaining an operation of the embodiment;

FIGS. 12 to 16B are views for explaining the main part of a second embodiment, in which FIG. 12 is a plan view of the operation panel in the apparatus, FIG. 13 is a schematic block diagram of a control system in the apparatus, FIG. 14 is a schematic block diagram of a positioning-mark generator, FIGS. 16A-1, 16A-2, and 16B are flow charts for explaining the operation of the second embodiment.

DETAILED DESCRIPTION OF THE PREFERRED EMBODIMENTS

A first embodiment of the present invention will be described with reference to the accompanying drawings.

Figures 2, 16A:
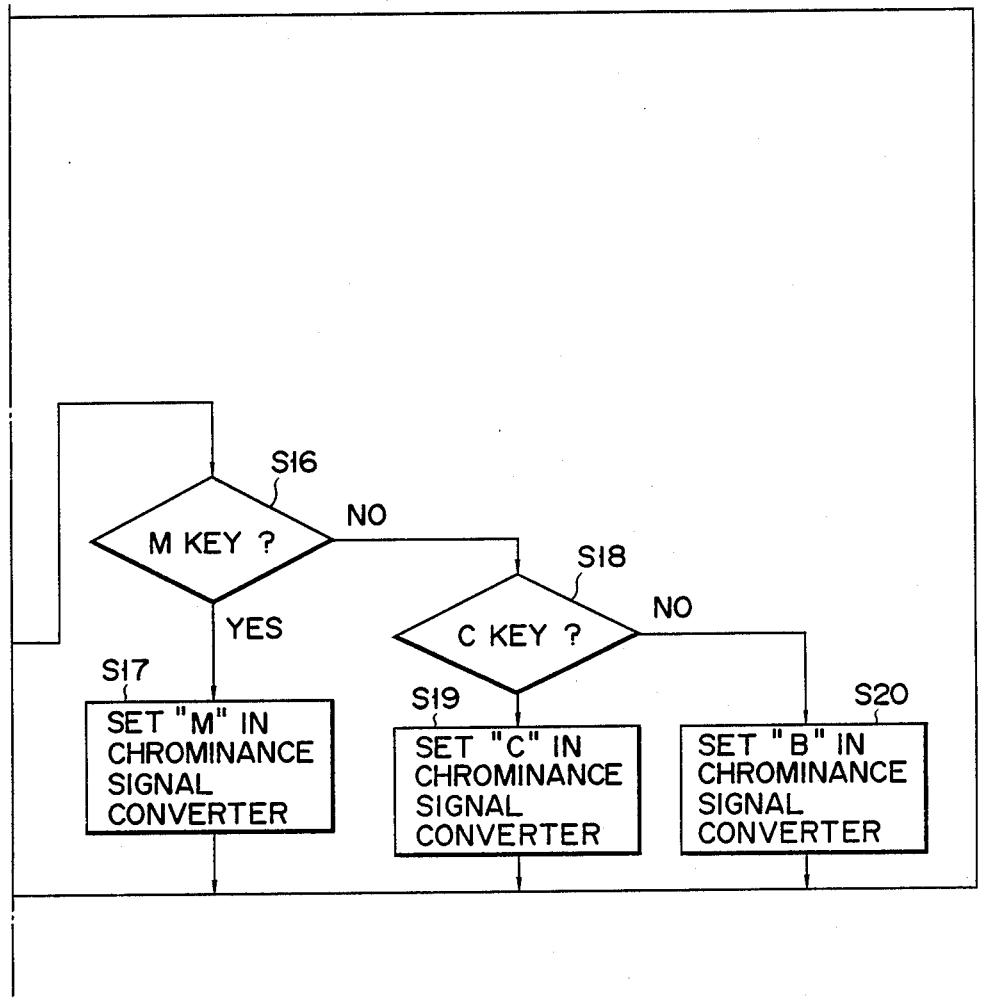
Figure 16B:
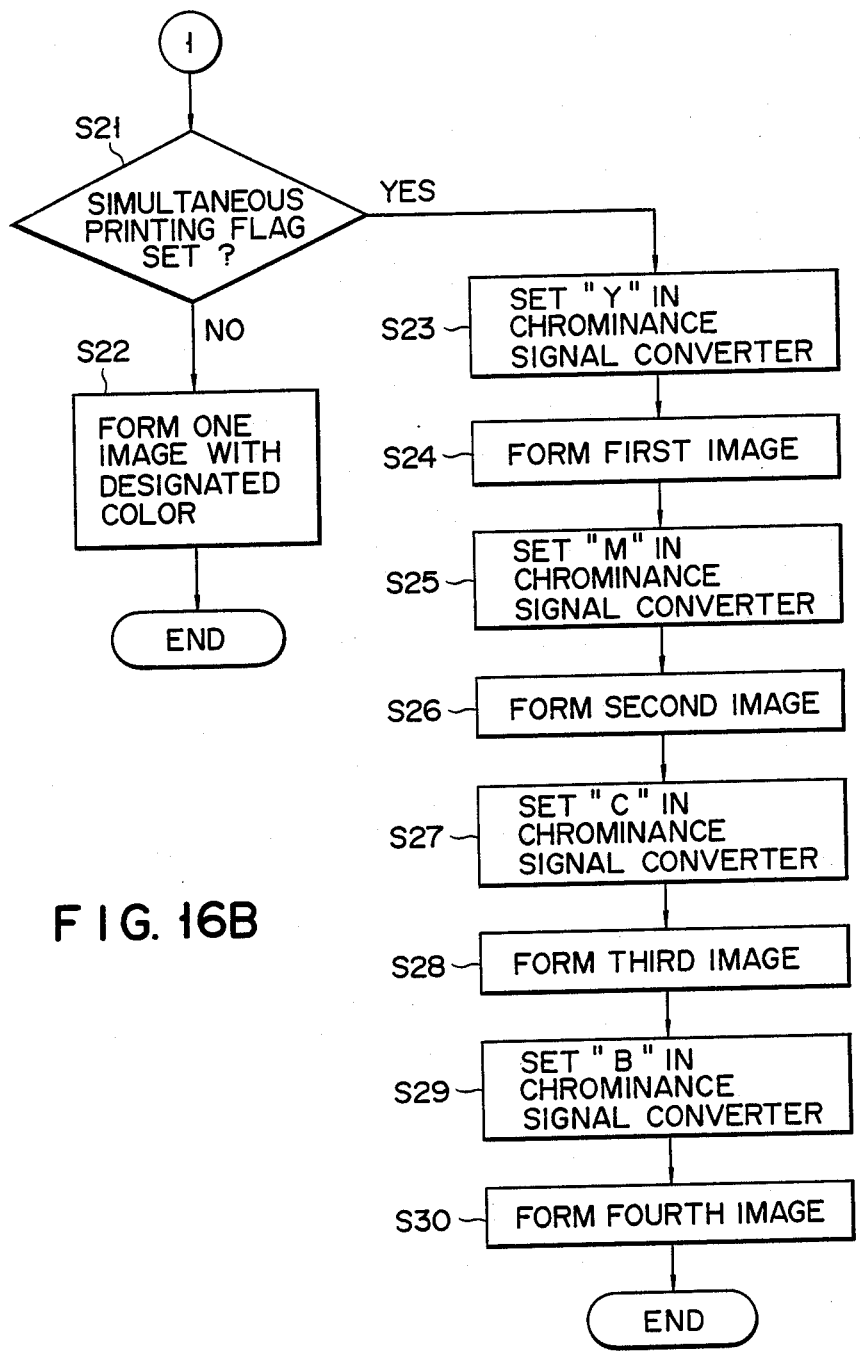

FIGS. 1 and 2 show a color copying machine as an image forming apparatus of the present invention, in which multicolor copies selectively using the areal gradation method and the density gradation method for halftone control and graphic arts films are selectively formed. Reference numeral 1 denotes a copying machine housing. Operation panel 2 is arranged on the front portion of the upper surface of housing 1. Original scanning unit 8 is arranged in the left portion of housing 1 to scan an original set on original table 7. Image forming unit 9 is arranged in the right portion of housing 1. Reference numeral 10 denotes an original cover mounted on table 7 to be freely opened/closed.

Figure 3:
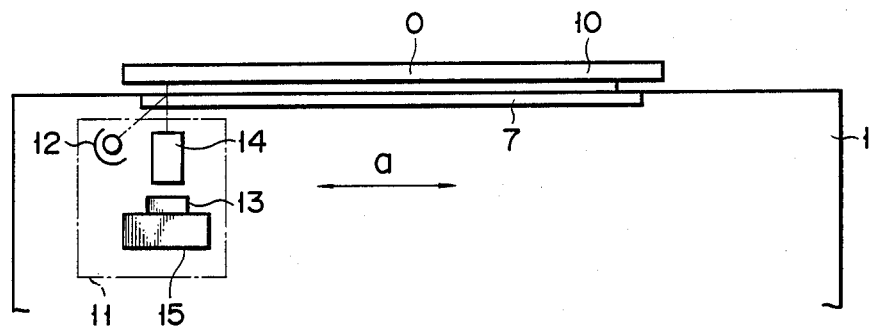
Figure 4:
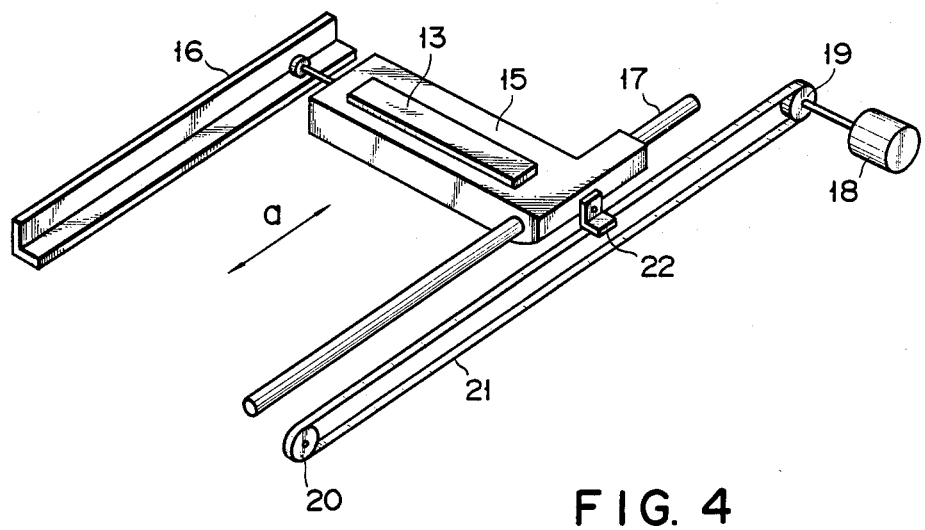

Original scanning unit 8 is arranged as shown in FIGS. 3 and 4. Original table 7 is fixed on housing 1. Scanner 11 is arranged below table 7 and reciprocated in the directions indicated by arrow a along the lower surface of table 7 to optically scan original O set on table 7. Scanner 11 thus reads an image formed on original O. Scanner 11 comprises illumination lamp 12 for illuminating original O, photoelectric transducer 13 for receiving light reflected by original O, optical system 14 for guiding light reflected by original O to transducer 13, and carriage 15 for supporting lamp 12, transducer 13, and optical system 14. Transducer 13 photoelectrically converts light reflected by original O into electrical signals. The image of original O is separated into cyan, green, and yellow (or red, green, and blue) color signals. Transducer 13 mainly comprises a CCD line image sensor. As shown in FIG. 4, carriage 15 is reciprocally guided in directions indicated by arrow a by guide roller 16 and guide shaft 17. Driving pulley 19 driven by reversible scanning motor (e.g., a stepping motor) 18 is coupled to one end of guide shaft 17. Timing belt 21 is looped between pulleys 19 and 20. One point of belt 21 is fixed to carriage 15 through fixing member 22. When scanning motor 18 is rotated in the forward or reverse direction, carriage 15 is linearly driven.

Figure 5:
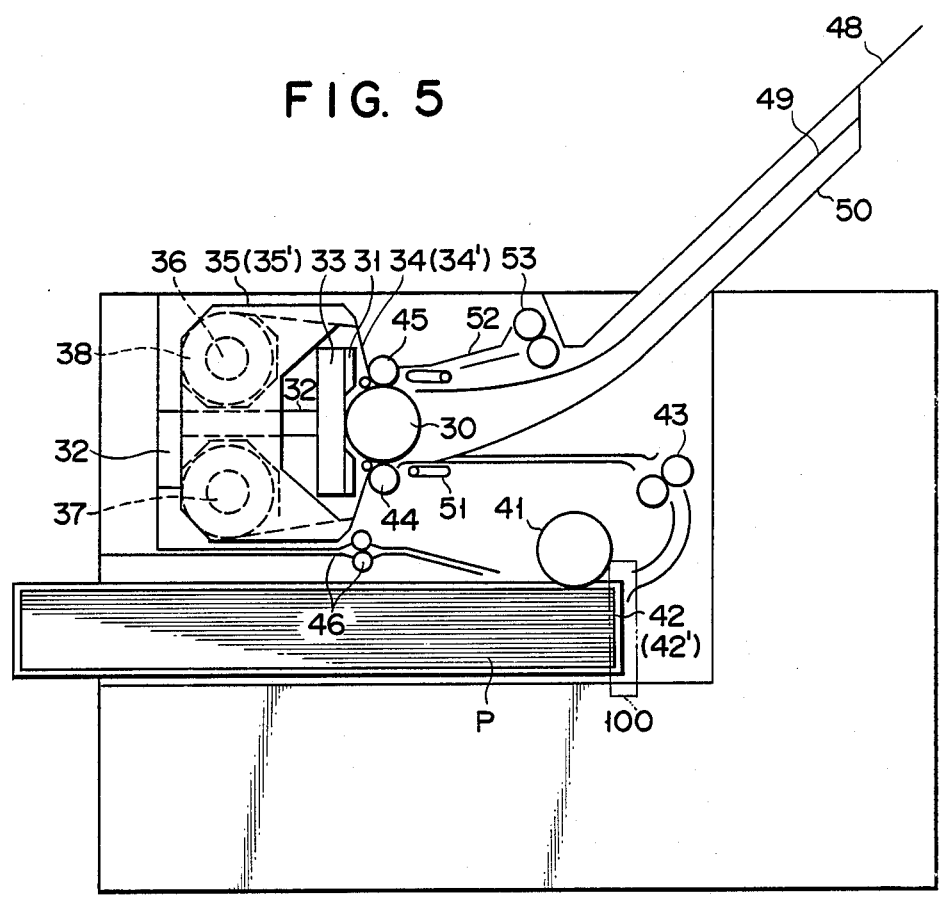

Image forming unit 9 is arranged as shown in FIG. 5. Platen 30 is arranged substantially at the center of image forming unit 9. Thermal head 31 is arranged to the left of platen 30. Head 31 is mounted on radiator 33 integral with the rear end face of holder 32. Ribbon cassette 35 (35') which stores meltage or sublimation thermal transfer ink ribbon 34 (34') as an image forming medium is detachably loaded through holder 32. Ink ribbon 34 is interposed between head 31 and platen 30. As shown in FIG. 4, ribbon cassette 35 (35') comprises two parallel reels 36 and 37. Ink ribbon 34 is housed in case 38 such that both ends of ink ribbon 34 (34') are wound around reels 36 and 37 and that the intermediate portion of ink ribbon 34 (34') is partially exposed to be interposed between platen 30 and 31. Reels 36 and 37 can be coupled to a drive shaft of a motor (not shown) through a drive force transmission mechanism (not shown) and can be rotated as needed. As shown in FIG. 1, ribbon cassette 35 can be detachably loaded in or unloaded from holder 32 through opening 39 formed on the right side surface of housing 1. Cover 40 is arranged to cover opening 39 and can be freely opened/closed.

A shape of ribbon cassette 35 which stores meltage ink ribbon 34 is different from that of ribbon cassette 35' which stores sublimation ink ribbon 34'. That is, a shape of ribbon cassette 35 (35') itself or ink ribbon discriminating means 35a such as a projection or a bar code provided to ribbon cassette 35 (35') is detected by ribbon cassette detector 97 comprising a light-emitting element and a light-receiving element to be described later.

Paper feed roller 41 is located at the lower right of platen 30 and picks up sheets (or plastic films) P as image transfer media stored in paper cassette 42 one by one. Sheet P picked up by roller 41 is fed to registration rollers 43 located at the upper right of roller 41. The leading edge of sheet P is aligned by registration rollers 43 and is wound around platen 30 by press rollers 44 and 45. Therefore, sheet P can be accurately fed. Paper cassette 42 is detachably mounted in the front surface of housing 1. Reference numeral 46 in FIG. 5 denotes a manual feed unit for allowing an operator to manually feed a single sheet.

Figure 6:
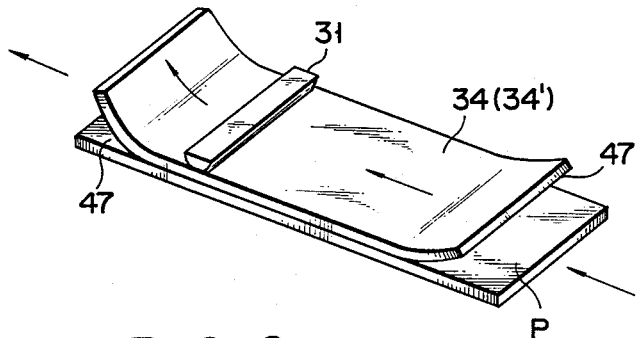
Figure 7:
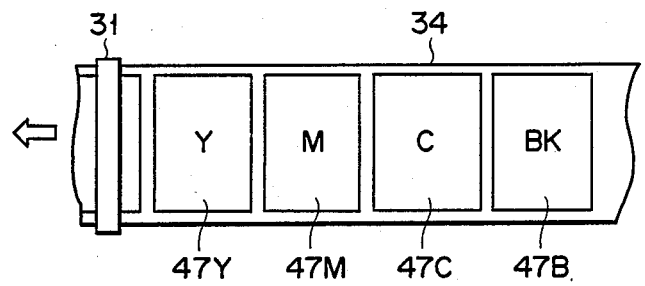

Thermal head 31 urges sheet P against platen 30 through ink ribbon 34 (34') and is designed to heat ink 47 as a color agent on ink ribbon 34 (34') so as to transfer ink 47 to sheet P, as shown in FIG. 6. In ink ribbon 34 (34'), yellow, magenta, cyan, and black ink portions 47Y, 47M, 47C, and 47B are arranged in the order named, as shown in FIGS. 6 and 7. Each of ink portions 47Y, 47M, 47C, and 47B has a length substantially equal to the width of sheet P. In color copying, sheet P is returned to a transfer start position every time each ink is transferred thereto, thereby accurately overlaying the inks one by one.

In color copying, ink portions 47Y, 47M, 47C, and 47B of ink ribbon 34 (34') are used to form an image on sheet P, as described above. In order to produce a graphic arts film, ink portions 47Y, 47M, 47C, and 47B of ink ribbon 34 (34') are used to form images on different block copy sheets (plastic films) P.

In color copying, sheet P is repeatedly reciprocated by the number of platen revolutions corresponding to the number of colors. In this case, sheet P is guided onto first and second guide plates 49 and 50 sequentially located along the lower surface of discharge tray 48 obliquely inclined on housing 1. Selective feeding of sheet P is performed by first and second selector gates 51 and 52 respectively located between platen 30 and first guide plate 49 and between platen 30 and second guide plate 50. More specifically, sheet P picked up from paper cassette 42 is fed through registration rollers 43 and first selector gate 51. After the leading end of sheet P is wound around platen 30, platen 30 is driven in the forward direction by a pulse motor (not shown). Thus, sheet P is fed at a constant speed. At the same time, heating elements (not shown) of thermal head 31 which are aligned in line along the axial direction of platen 30 are selectively heated in accordance with a printing signal, and ink 47 of ink ribbon 34 (34') is transferred to sheet P. The leading end of sheet P passing platen 30 is fed to first guide plate 49 located along the lower surface of discharge tray 48 by second selector gate 52 located at a position indicated by the solid line. When transfer of one ink 47 to sheet P is completed, platen 30 is rotated in the reverse direction. Sheet P is then fed in the reverse direction and is returned to the transfer start position. In this case, the trailing end of sheet P is directed by first selector gate 51 toward second guide plate 50 located along the lower surface of first guide plate 49. In this manner, sheet P is repeatedly reciprocated to transfer inks of different colors thereto. When all inks 47 have been transferred to sheet P, sheet P is guided to discharge rollers 53 by second selector gate 52 pivoted to a position indicated by the alternate long and two short dashed line. Sheet P is finally discharged onto discharge tray 48 by discharge rollers 53.

In order to form a graphic arts film, the number of transfer cycles is one, and no reciprocation of sheet P is performed. After one transfer cycle, sheet P is discharged onto discharge tray 48.

Figure 8:
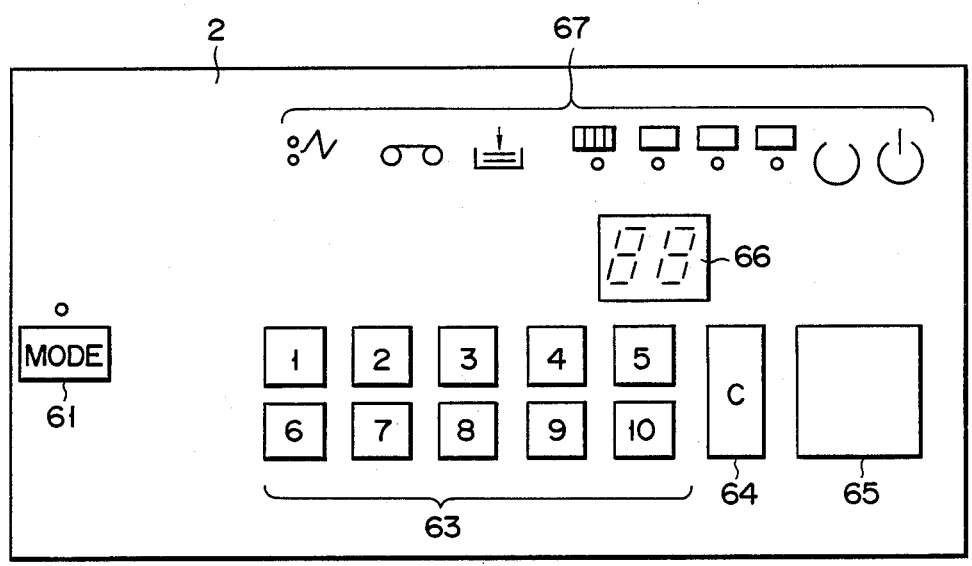

FIG. 8 shows operation panel 2. Panel 2 includes ten keys 63 for entering the number of sheets to be copied, clear key 64 for clearing the number of sheets to be copied, copying key 65 for initiating copying, numerical display 66 for displaying the number of copied sheets, and state display 67 for displaying an operating state.

Figure 9:
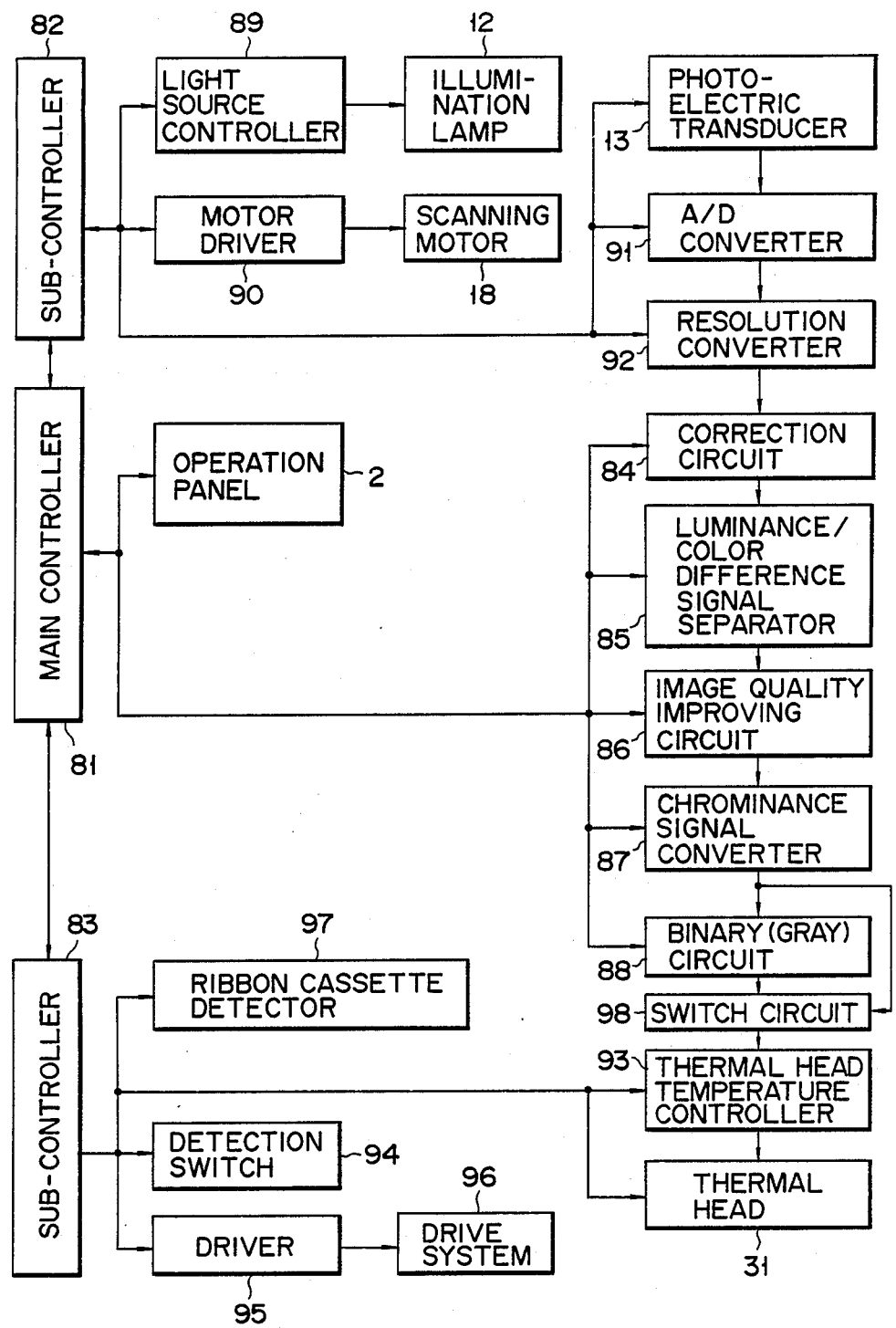

FIG. 9 schematically shows the overall control system. The system comprises main controller 81 and first and second sub-controllers 82 and 83. Main controller 81 is connected to operation panel 2, correction circuit 84, luminance/color difference signal separator 85, image quality improving circuit 88, and first and second sub-controllers 82 and 83, and controls them. Main controller 81 is also connected to ribbon cassette detector 97. In accordance with a detection result from detector 97, controller 81 detects whether ink ribbon 34 (34') is a meltage or sublimation type and determines whether halftone control is to be performed by the areal or density gradation method. When main controller 81 determines that the areal gradation method is to be used, it sets thermal head temperature controller 93 in a fixed density mode, and controls switch circuit 98 to supply a signal subjected to areal gradation by binary circuit 88 to controller 93. When main controller 81 determines that the density gradation method is to be used, it sets thermal head temperature controller 93 in a variable density mode, and controls switch circuit 98 to supply a signal corresponding to the density from chrominance signal converter 87 to controller 93.

First controller 82 is connected to light source controller 89, motor driver 90, photoelectric transducer 13, A/D converter 91, resolution converter 92, and ribbon cassette detector 97, and controls them. Light source controller 89 is connected to lamp 12 to control the amount of light emitted thereby. Motor driver 90 is connected to scanning motor 18, and drives it. Second sub-controller 83 is connected to thermal head temperature controller 93, thermal head 31, various detection switches 94, and driver 95 and controls them. Driver 95 is connected to drive system 96, such as a motor and a solenoid, and drives it.

The signal flow in the arrangement shown in FIG. 9 will be described below. Light emitting from lamp 12 and reflected by the original is focused on photoelectric transducer 13. Transducer 13 separates the reflected light into cyan (C), green (G), and yellow (Y) analog color signals. These analog signals are supplied to A/D converter 91. ADD converter 91 converts these analog color signals into digital color signals. The digital signals are supplied to resolution converter 92. Converter 92 performs resolution conversion for matching the resolution of transducer 13 with that of thermal head 31. A conversion result from converter 92 is supplied to correction circuit 84. Correction circuit 84 performs correction processing of C, G, and Y color signals sent from resolution converter 92 so as to correct variations in photoelectric transducer 13. A correction result is sent to luminance/color difference signal separator 85. Separator 85 performs various types of processing for the C, G, and Y color signals from correction circuit 84 to generate luminance signal (I) and color difference signals (C1 and C2). The luminance and color difference signals are supplied to image quality improving circuit 86. Circuit 86 analyzes the luminance signal and the first and second color difference signals to perform image improving processing such as edge emphasis and character designation. An output from circuit 86 is supplied to chrominance signal converter 87. Converter 87 performs color conversion on the basis of the luminance and color difference signals after image quality improvement and generates one (corresponding to the density) of yellow (Y), magenta (M), cyan (C), and black (B) (printing primaries (Y, M, and C) plus B) color signals. The selected color signal is supplied to binary circuit 88 and switch circuit 98. Binary circuit 88 performs areal gradation conversion by the dither method, i.e., binarization of the color signal (i.e., one of the Y, M, C, and B color signals). The binary signal from circuit 88 is supplied to switch circuit 98. Circuit 98 selectively supplies the signal from binary circuit 88 or the signal from chrominance signal converter 87 to thermal head temperature controller 93 under the control of main controller 81. When controller 93 is set in the fixed density mode by main controller 81, it sends a printing signal with the fixed density on the basis of the binary signal from binary circuit 88 to thermal head 31. When controller 92 is set in the variable density mode by main controller 81, it sends a printing signal corresponding to the density on the basis of the density signal from chrominance signal converter 87 supplied from switch circuit 98 to head 31. Thermal head temperature controller 93 is a circuit for controlling thermal sublimation ink ribbon 34'. When thermal meltage ink ribbon 34 is used, a fixed density is used. Thermal head 31 performs printing (i.e., image formation) on the basis of the printing signal.

Chrominance signal converter 87 will be described in more detail with reference to FIG. 10. The luminance signal (I), the color difference signal (C1) and the color difference signal (C2) all of which are sent from image quality improving circuit 86 are input to chrominance signal converter 87. One of the Y, M, C, and B signals is selected and sent to binary circuit 88. Selection for the Y, M, C, and B color signals is controlled by main controller 81. More specifically, as shown in the following table, main controller 81 selects one of the Y, M, C, and B color signals to be sent to binary circuit 88 in accordance with a combination of selection signals a and b. In this case, color signals are automatically selected in a given order (e.g., an order of Y, M, C, and B).

|   | a | b |
|---|---|---|
| Y | 0 | 0 |
| M | 0 | 1 |
| C | 1 | 0 |
| B | 1 | 1 |

During a block copy formation mode, not the density gradation method but the areal gradation method is used.

The operation of the image forming apparatus according to the above embodiment will be described with reference to the flow chart of FIG. 11. First, in step S1, main controller 81 determines whether a graphic arts film formation mode is set. If NO in step S1, the mode is determined as a normal color copying mode. In this case, the flow advances to step S2. In step S2, controller 81 determines whether copying key 65 is turned on. If NO in step S2, the flow returns to step S1. If YES in step S2, the flow advances to step S21. In step S21, controller 81 determines whether the ink ribbon is a meltage or sublimation type on the basis of a detection result of ribbon cassette detector 97. If the ink ribbon is determined as the meltage type, the flow advances to step S22. In step S22, controller 81 sets thermal head temperature controller 93 in a fixed density mode, and controls switch circuit 98 to supply a signal gradation-converted by binary circuit 88 to controller 93. Then, the flow advances to step S3. In step S3, an image is formed while the density is fixed by controller 93. That is, since the color copying mode is set, color copying (image formation) using all the colors of thermal meltage ink ribbon 34 is performed in accordance with the operation described above.

If main controller 81 determines in step S21 that sublimation ink ribbon 34' is set, the flow advances to step S23. In step S23, controller 81 sets thermal head temperature controller 93 in a variable density mode, and controls switch circuit 98 to supply a signal corresponding to the density from chrominance signal converter 87 directly to controller 93. Then, the flow advances to step S3. In step S3, an image is formed in correspondence to the density by controller 93. That is, since the color copying mode is set, color copying (image formation) using all the colors of ink ribbon 34' is performed in accordance with the operation described above.

If the graphic arts film formation mode is set in step S1, the flow advances to step S4. In step S4, main controller 81 determines whether copying key 65 is turned on. If NO in step S4, the flow returns to step S1. If YES in step S4, the flow advances to step S5. In step S5, controller 81 sends a conversion instruction for the yellow (Y) color signal to chrominance signal converter 87 as an initialization signal, and then the flow advances to step S6. In step S6, an image corresponding to a yellow component of an original image is formed on first plastic film P using yellow ink portion 47Y of ink ribbon 34, and then the flow advances to step S7.

In step S7, main controller 81 sends a conversion instruction for the magenta (M) color signal to chrominance signal converter 87, and then the flow advances to step S8. In step S8, an image corresponding to a magenta component of the original image is formed on second plastic film P using magenta ink portion 47M of ink ribbon 34, and then the flow advances to step S9.

In step S9, main controller 81 sends a conversion instruction for the cyan (C) color signal to chrominance signal converter 87, and then the flow advances to step S10. In step S10, an image corresponding to a cyan component of the original image is formed on third plastic film P using cyan ink portion 47C of ink ribbon 34, and then the flow advances to step S11.

In step S11, main controller 81 sends a conversion instruction for the black (B) color signal to chrominance signal converter 87, and then the flow advances to step S12. In step S12, an image corresponding to a black component of the original image is formed on fourth plastic film P using black ink portion 47B of ink ribbon 34, and the processing is ended.

Thus, in the first embodiment, the main controller detects whether the ribbon cassette for the ink ribbon is a meltage or sublimation type. If a detection result represents the meltage type, image formation is performed by the areal gradation method. If the detection result represents the sublimation type, image formation is performed by the density gradation method. Therefore, the areal and density gradation methods can be arbitrarily used by a single apparatus, and selection thereof can be automatically performed without providing a special selection switch. In addition, an operation error, a printing error, and the like can be prevented.

In the above embodiment, processing is performed while the thermal head temperature controller is set in the fixed density mode in the areal gradation method. However, the binary circuit may output a density signal with a fixed density.

As has been described above in detail, according to the first embodiment of the present invention, there is provided a very convenient image forming apparatus in which the areal and density gradation methods can be arbitrarily used.

Main parts of an image forming apparatus with a halftone control function and a positioning-mark forming function according to a second embodiment of the present invention will be described below with reference to the accompanying drawings and only those parts which are different from that of the first embodiment will be described in detail.

Figure 12:
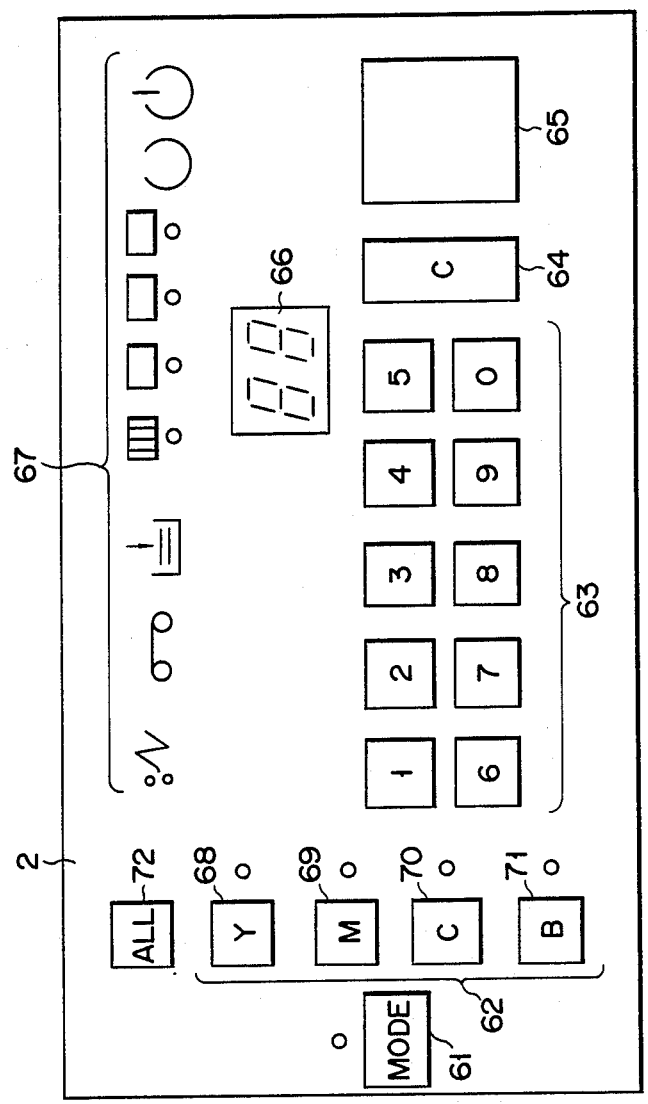

In panel 2' shown in FIG. 12, color selection keys 62 comprise Y key 68 for designating yellow (Y), M key 69 for designating magenta (M), C key 70 for designating cyan (C), B key 71 for designating black (B), and continuous printing key 72 for designating sequential outputs of the different colors. The other arrangement is the same as that of the first embodiment.

Figure 13:
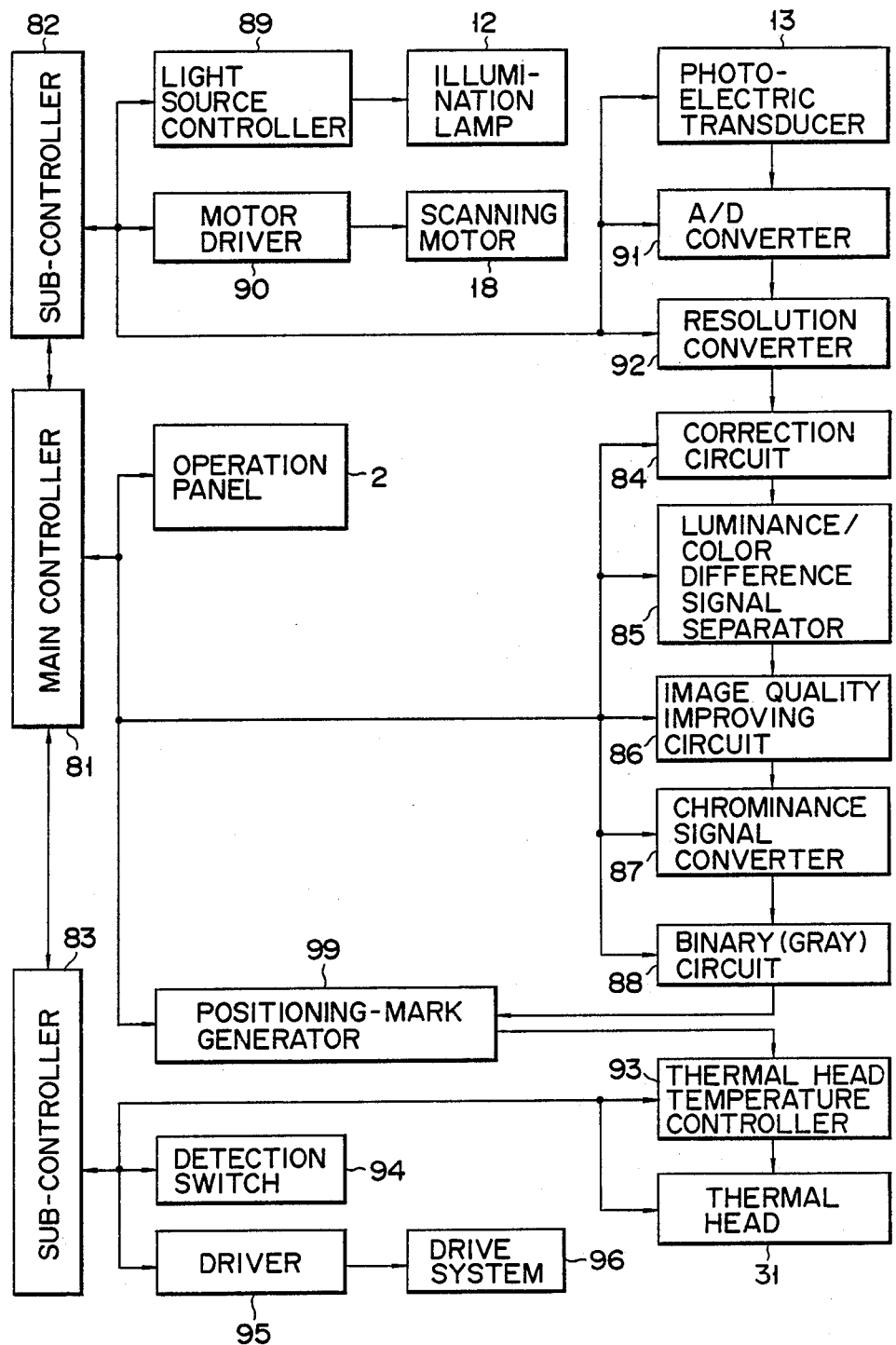

In the schematic block diagram of the overall control system shown in FIG. 13, main controller 81 outputs a mark formation signal ("1" signal) to positioning-mark generator 99 when a single-color mode is selected by mode key 61 of the operation panel 2.

Note that in the second embodiment, an arrangement is such that only the areal gradation method using thermal meltage ink ribbon 34 is adopted as a halftone control method or a gradation method.

Binary circuit 88 performs areal gradation conversion, i.e., binarization of the color signals (i.e., one of the Y, M, C, and B color signals). The binary signal from circuit 88 is supplied to positioning-mark generator (generating means) 99. Generator 99 adds a pattern of positioning marks A to the binary signal from binary circuit 88 in response to the mark formation signal ("1" signal) from main controller 81. The output from generator 99 is supplied to thermal head temperature controller 93. Alternatively, generator 99 supplies the binary signal from binary circuit 88 to controller 93 without adding the pattern of positioning marks A to the binary signal. Thermal head temperature controller 93 sends a printing signal to thermal head 31 on the basis of the binary signal sent from positioning-mark generator 99. Thermal head 31 performs printing (i.e., image formation) on the basis of the printing signal.

In this case, color signals are automatically selected in a given order (e.g., an order of Y, M, C, and B) in the full-color copying mode. However, in the single-color mode, the color signal corresponding to one of color selection keys 62 is selected.

Positioning-mark generator 99 will be described in more detail with reference to FIG. 14. Positioning-mark generator 99 comprises: horizontal counter 100 which performs a count-up operation in response to a data sync signal (DCLK) from main controller 81 and is cleared in response to a line sync signal (HSYNC); vertical counter 101 which performs a count-up operation in response to the line sync signal (HSYNC) from main controller 81 and is cleared in response to a page sync signal (PSYNC) ROM 102 for outputting, at output terminals 102a (HD1) and 102b (HD2), address signals corresponding to a count from horizontal counter 100 and a pattern selection signal from output terminal 103a of ROM 103; ROM 103 for outputting an address signal corresponding to a count of vertical counter 101 from output terminals 103a (VD1) and 103b (VD2); AND gate 104 for producing an AND output of the horizontal mark signal from output terminal 102a and the vertical mark signal from output terminal 103b; AND gate 105 for producing an AND output of the mark formation signal (MCOM) from main controller 81 and an output from AND gate 104; buffer 107 for supplying the binary signal (image data or RDAT) to thermal head temperature controller 93 only when the output from AND gate 105 is not supplied through inverter 106; and buffer 108 for outputting register mark data (i.e., positioning mark data) from output terminal 102b of ROM 102 to thermal head temperature controller 93 only when the output from AND gate 105 is supplied thereto.

Patterns of positioning marks A are set in ROMs 102 and 103. The relationship between the outputs and data outputs to thermal head temperature controller 93 is summarized as follows:

| Output | Output Terminal 102a | Output Terminal 103b | Output Terminal 103a | Output Terminal 102b | Mark-Forming Signal |
|---|---|---|---|---|---|
| Register mark data 1 | 1 | 1 | 1 | data 1 | 1 |
| Register mark data 2 | 1 | 1 | 0 | data 2 | 1 |
| Image data | 0 | — | — | — | — |
| Image data | — | 0 | — | — | — |
| Image data | — | — | — | — | 0 |

Figure 15A:
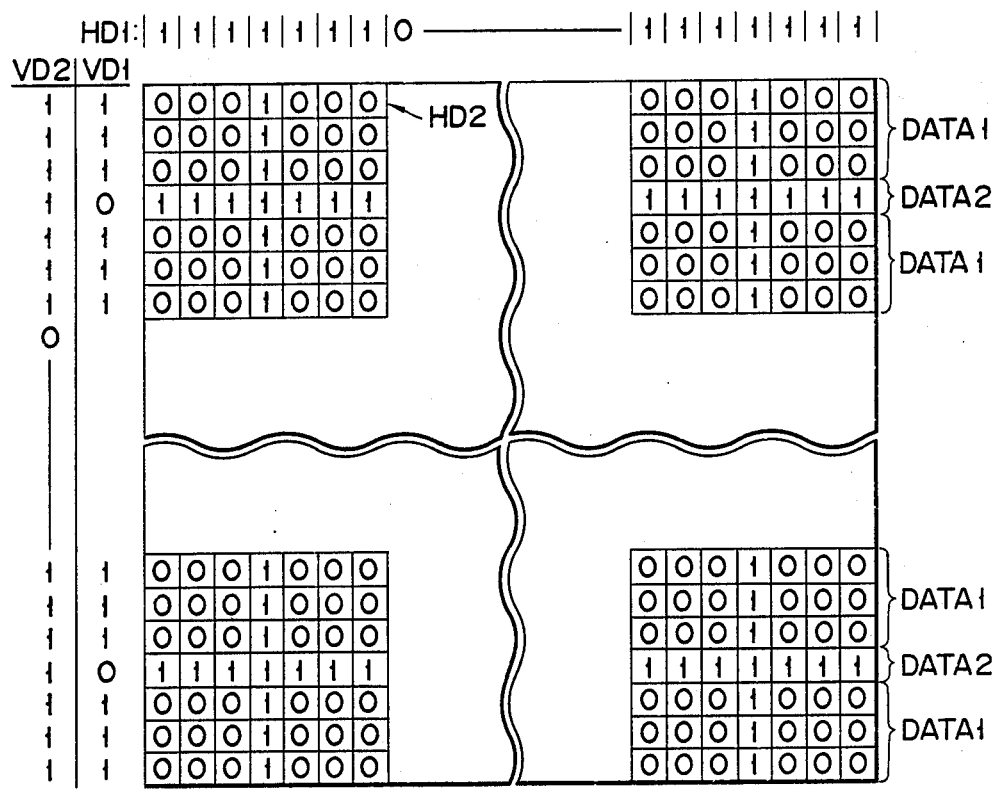
FIG. 15A is a view showing the relationship between image data and positioning-mark patterns.
Figure 15B:
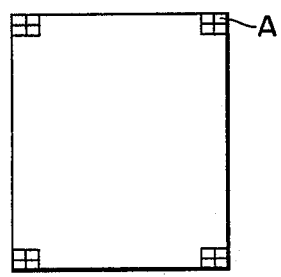
FIG. 15B is a view showing a print state of the image and positioning marks.

As shown in FIG. 15A, the patterns of positioning marks A at four corners are output. Except for an addition of these patterns, image data from binary circuit 88 is supplied to thermal head temperature controller 93 without any modifications. As a result, positioning marks A as shown in FIG. 15B are printed at four corners and a the same time a main image is also printed in the blank portion.

The operation of the image forming apparatus according to the second embodiment will be described with reference to flow charts of FIGS. 16A-1, 16A-2, and 16B. In step S1, main controller 81 determines whether a single-color mode is set. If NO in step S1, the mode is determined as a normal color copying mode. In this case, the flow advances to step S2. Controller 81 supplies a "0" signal as a reset signal to AND gate 105 in positioning-mark generator 99, and the flow advances to step S3. In step S3, controller 81 determines whether copying key 65 is depressed. If NO in step S3, the flow returns to step S1. However, if YES in step S3, the flow advances to step S4. In step S4, image formation is performed. In this case, since the color copying mode is set, color copying (image formation) is performed using thermal transfer ink ribbon 34 of different colors.

If YES in step S1, i.e., if the single-color mode is determined to be set, the graphic arts film mode is set. In this case, the flow advances to step S5. In step S5, main controller 81 supplies the "1" signal as a mark formation signal to AND gate 105 in positioning-mark generator 99, and the flow advances to step S6. In step S6, the continuous printing flag is reset, and the flow advances to step S7. In step S7, controller 81 sends a conversion instruction for the yellow (Y) color signal to chrominance signal converter 87. The flow then advances to step S8. Controller 81 determines in step S8 whether continuous printing key 72 is depressed. If NO in step S8, the flow advances to step S10. However, if YES in step S8, the flow advances to step S9. In step S9, the continuous printing flag is set. The flow then advances to step S10. Controller 81 determines in step S10 whether one of color selection keys 62 is depressed. If NO in step S10, the flow advances to step S11. Controller 81 determines in step S11 whether the single-color mode is cleared upon depression of mode key 61. If YES in step S11, the flow returns to step S1. However, if NO in step S11, the flow advances to step S12. Controller 81 determines in step S12 whether copying key 65 is depressed. If NO in step S12, the flow returns to step S8. However, if YES in step S12, the flow advances to step S21.

If YES in step S10, i.e., one of color selection keys 62 is determined to be depressed, the flow advances to step S13. In step S13, the continuous printing flag is reset. The flow then advances to step S14. Controller 81 determines in step S14 whether Y key 68 is depressed. If YES in step S14, the flow advances to step S15. In step S15, controller 81 sends a conversion instruction for the yellow (Y) color signal to chrominance signal converter 87. The flow then returns to step S8.

If NO in step S14, the flow advances to step S16. Controller 81 determines in step S16 whether M key 69 is depressed. If YES in step S16, the flow advances to step S17. In step S17, controller 81 sends a conversion instruction for the magenta (M) color signal to chrominance signal converter 87. The flow then returns to step S8.

However, if NO in step S16, the flow advances to step S18. Controller 81 determines in step S18 whether C key 70 is depressed. If YES in step S18, the flow advances to step S19. In step S19, controller 81 sends a conversion instruction for the cyan (C) color signal to chrominance signal converter 87. The flow returns to step S8.

If NO in step S18, the flow advances to step S20. Controller 81 sends a conversion instruction for the black (B) color signal to chrominance signal converter 87 in step S20 and the flow returns to step S8.

Controller 81 determines in step S21 whether the continuous printing flag is set. If NO in step S21, the flow advances to step S22.

In step S22, an image with a designated color component is formed on one sheet. In this case, i.e., in the graphic arts film mode, single-color copying (i.e., image formation) using the black thermal transfer ink ribbon is performed, as previously mentioned. If the signal conversion instruction representing yellow (Y) is supplied to chrominance signal converter 87, an image corresponding to the yellow (Y) component of the original image is formed. If the signal conversion instruction representing magenta (M) is supplied to chrominance signal converter 87, an image corresponding to the magenta (M) component of the original image is formed. If the signal conversion instruction representing cyan (C) is supplied to chrominance signal converter 87, an image corresponding to the cyan (C) component of the original image is formed. If the signal conversion instruction representing black (B) is supplied to chrominance signal converter 87, an image corresponding to the black (B) component of the original image is formed. It should be noted that the black thermal transfer ink ribbon has been set and plastic films as sheets P have been set in advance. Therefore, graphic arts films corresponding to the yellow, magenta, cyan, and black components of the original image can be obtained.

If the continuous printing flag is set in step S21, the flow advances to step S23. In step S23, controller 81 sends a conversion instruction for the yellow (Y) color signal to chrominance signal converter 87. The flow then advances to step S24. The image corresponding to the image of the yellow component is formed on the first plastic film or paper sheet in step S24, and the flow advances to step S25.

In step S25, controller 81 sends a conversion instruction for the magenta (M) color signal to chrominance signal converter 87. The flow advances to step S26. In step S26, the image corresponding to the magenta component of the original image is formed on the second plastic film or paper sheet. The flow then advances to step S27.

In step S27, the conversion instruction for the cyan (C) color signal is sent to chrominance signal converter 87. The flow advances to step S28. In step S28, the image corresponding to the cyan component of the original image is formed on the third plastic film or paper sheet. The flow then advances to step S29.

In step S29, the conversion instruction for the black (B) color signal is sent to chrominance signal converter 87. The flow advances to step S30. In step S30, the image corresponding to the black component of the original image is formed on the fourth plastic film or paper sheet.

The method of adding positioning marks A to sheets or films in the single-color image formation mode will be described below.

In the single-color mode, the mark formation signal, i.e., the "1" signal is supplied from main controller 81 to AND gate 105. AND gate 105 is then enabled. In this state, the image signal of one component of the original is supplied from binary circuit 88 to buffer 107 and is stored therein. In this case, the data sync signal (DCLK) and the line sync signal (HSYNC) are supplied from main controller 81 to counter 100. The line sync signal (HSYNC) and the page sync signal (PSYNC) are supplied to counter 101.

When the image signal representing the first column of the first line is supplied to buffer 107, counters 100 and 101 perform count-up operations. The "1" signal as the pattern selection signal is output from output terminal 103a of ROM 103. The "1" signal as the vertical mark signal is output from output terminal 103b. A "1" signal as a horizontal mark signal is output from output terminal 102a of ROM 102 in response to a count from counter 100 and the signal from output terminal 103a. A "0" signal as register mark data is output from output terminal 102b. The register mark data is stored in buffer 108.

A "1" signal is output from AND gate 104 in response to the vertical mark signal from output terminal 103b and the horizontal mark signal from output terminal 102a. The output from AND gate 104 is supplied to buffer 108 through AND gate 105 and to buffer 107 through AND gate 105 and inverter 106.

The register mark data of logic "0" stored in buffer 108 is supplied as an output from positioning-mark generator 99 to thermal head temperature controller 93. In this case, data output of buffer 107 is inhibited.

Thereafter, register mark data are output for the four corners of the image in the same manner as described above.

When image formation for one color component of the original image is performed in the single-color mode, the patterns of positioning marks A are respectively output at the four corners, as shown in FIG. 15A. Excluding these patterns, image data for one color component is supplied from binary circuit 88 to thermal head temperature controller 93 without modifications. As a result, cross positioning marks A are formed at four corners of the sheet. Besides these marks, an image of one color component is printed on the sheet, as shown in FIG. 15B.

As is apparent from the above description, the original is optically scanned to obtain cyan, green, and yellow color signals, and these color signals are converted into yellow, magenta, cyan, and black image formation signals. Image formation is performed on plastic films or paper sheets using a black thermal transfer ink ribbon in accordance with one of the color formation signals or sequentially output four image formation signals. Without performing conventional complicated techniques such as exposure and development, graphic arts films can be simply produced with halftone control using a relatively simple, compact, inexpensive arrangement. In addition, image formation may be performed on paper sheets by using a thermal transfer ink ribbon of different colors in accordance with image formation signals of four colors. Therefore, the image forming apparatus according to this embodiment can be conveniently used as a color copying machine in addition to a special machine for producing graphic arts films.

Positioning marks can be easily and accurately formed on graphic arts films (block copies).

In addition, the positioning marks are added without areal gradation conversion. That is, the positioning marks are not subjected to areal gradation conversion together with an image and hence can be clearly seen. Therfore, clear and accurate positioning marks can be formed.

In the above embodiment, the positioning marks are formed at four corners of the sheet or film. However, one or more marks may be formed. When two or more marks are used, accurate positioning can be performed.

In the above embodiment, a mode key is arranged in the operation panel, and mode selection can be performed using this key. However, a ten-key pad arranged in the operation panel may be used to input a mode selection code, thereby selecting a desired mode.

A separate printing positioning mark designation switch may be arranged in place of the mode key to designate formation of register marks.

In the above embodiment, the gradation method is the areal gradation method. However, other gradation methods such as the density gradation method may be used.

According to the second embodiment of the present invention as has been described in detail, without using conventional complicated techniques, graphic arts films can be easily produced with halftone control using a compact and inexpensive arrangement. The image formation apparatus according to this embodiment also serves as a color copying machine and, at the same time, easily and accurately forms the positioning marks on graphic arts films without halftone control.

What is claimed is:

1. An image forming apparatus with a halftone control function, said apparatus comprising:
   means for outputting image data;
   image forming means for forming an image corresponding to the image data on an image receiving medium by selectively using at least first and second image forming media different from each other;
   gradation determining means for determining first and second gradation methods corresponding to said first and second image forming media which are selectively used; wherein
   said gradation determining means determines on the basis of discriminating means provided in a cassette which stores said first or second image forming medium;
   first gradation means for performing gradation conversion corresponding to the first gradation method;
   second gradation means for performing gradation conversion corresponding to the second gradation method; and
   control means for supplying the image data to said image forming means through said first or second gradation means in response to a determination result from said gradation determining means so that said image forming means forms a halftone image.

2. An apparatus according to claim 1, wherein said discriminating means comprises a shape of the cassette itself.

3. An apparatus according to claim 1, wherein said discriminating means comprises a projection provided in the cassette.

4. An apparatus according to claim 1, wherein said discriminating means comprises a bar code provided on the cassette.

5. An image forming apparatus with a halftone control function and a positioning-mark formation function, said apparatus comprising:
   color image data output means for outputting color image data to be formed on an image receiving medium as a main image;
   positioning-mark data output means for outputting positioning-mark data to be formed on a predetermined position of said image receiving medium as a positioning-mark to be used after image formation;
   gradation means for performing predetermined gradation conversion of the color image data; and
   image forming means for forming the main image with halftone control on said image receiving medium using a single- or multi-color image forming medium in accordance with the color image data subjected to gradation conversion and the positioning-mark data, and for forming the positioning-mark without a halftone control on the predetermined position of said image receiving medium.

6. An apparatus according to claim 5, wherein said positioning-mark has a cross shape.

7. An apparatus according to claim 5, wherein said gradation means performs areal graduation conversion.

8. An apparatus according to claim 5, further comprising
   designating means for designating formation of positioning-marks.

9. An apparatus according to claim 8, wherein said designating means comprises a positioning-mark designation switch provided on an operation panel.

10. An apparatus according to claim 5, wherein said color image data have cyan, green, and yellow color signals, or red, green, and blue color signals.

11. An apparatus according to claim 5, wherein multi-color image forming signals are yellow, magenta, cyan, and black image forming signals, or yellow, magenta, and cyan image forming signals.

12. An apparatus according to claim 5, wherein said single-color image forming medium consists of a single color of black, and said multi-color image forming medium consists of four colors of yellow, magenta, cyan, and black, or three colors of yellow, magenta, and cyan.

13. An apparatus according to claim 5, wherein said image forming medium comprises a thermal transfer ink ribbon.

14. An apparatus according to claim 5, wherein said image receiving medium comprises either paper plastic film.

15. An apparatus according to claim 5, wherein an image formed on said image receiving medium is used to form an original plate for offset printing.

16. An apparatus according to claim 15, wherein positioning-marks are generated only when an original plate for offset printing is to be formed.

* * * * *